H. SMITH AND M. H. PAINE.
INTERNAL COMBUSTION ENGINE.
APPLICATION FILED NOV. 21, 1919.

1,413,363.

Patented Apr. 18, 1922.

INVENTORS
Harold Smith
Marshall Harcourt Paine
By Bakewell, Byrnes & Parmelee
their attys.

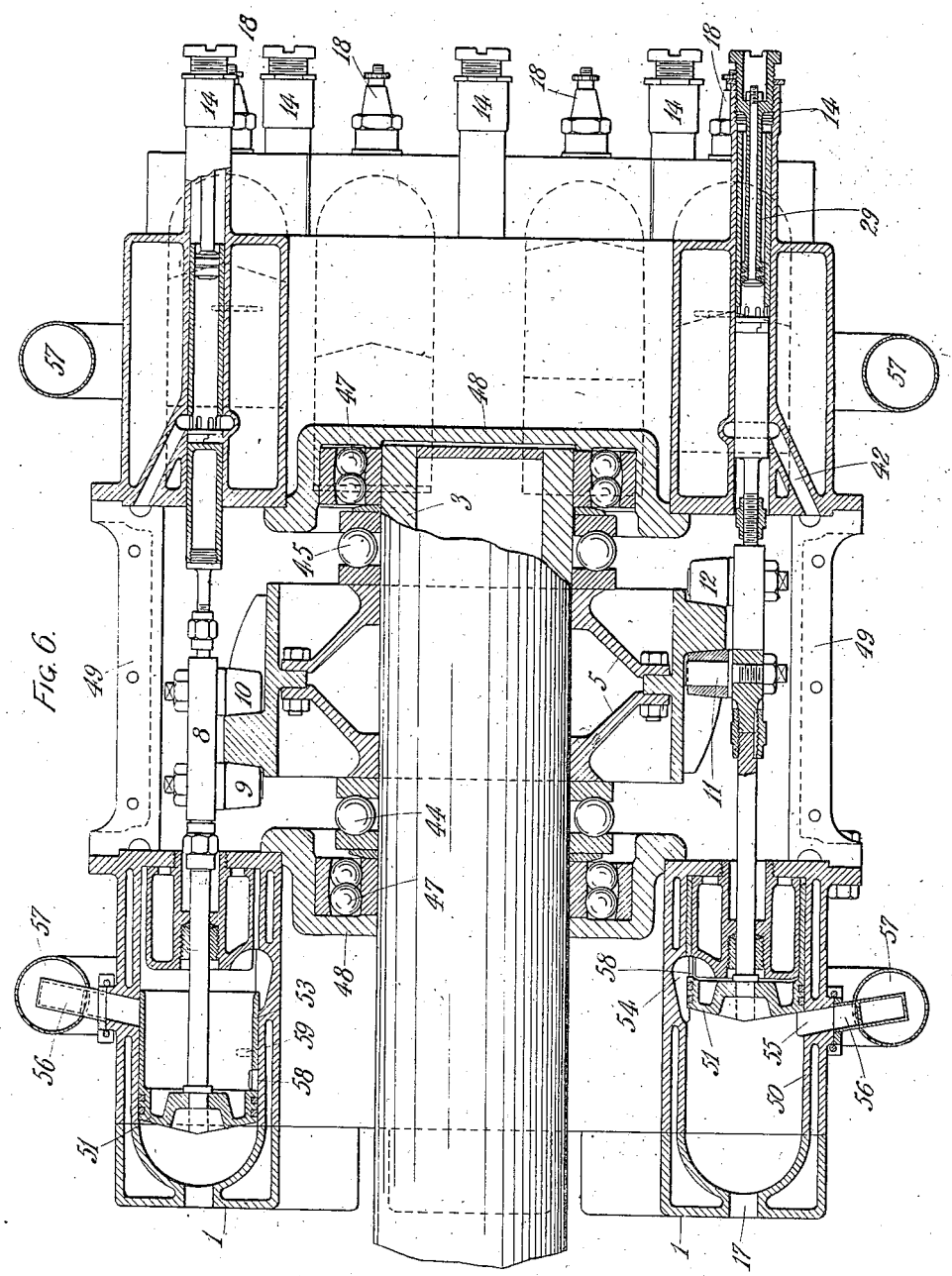

UNITED STATES PATENT OFFICE.

HAROLD SMITH, OF MITCHAM, AND MARSHALL HARCOURT PAINE, OF WOKING, ENGLAND.

INTERNAL-COMBUSTION ENGINE.

1,413,363.  Specification of Letters Patent.  Patented Apr. 18, 1922.

Application filed November 21, 1919. Serial No. 339,643.

*To all whom it may concern:*

Be it known that we, HAROLD SMITH and MARSHALL HARCOURT PAINE, both subjects of the King of England, residing at 44 Garden Avenue, Mitcham, Surrey, England, and Mabury, Woking, England, respectively, have invented certain new and useful Improvements in or Relating to Internal-Combustion Engines, of which the following is a specification.

The present invention relates broadly to internal combustion engines, and more particularly to multi-cylinder engines of the two-cycle type but the principal object of the present invention is to provide a multi-cylinder engine having means for uniformly transmitting power to the driving shaft.

A further object of the present invention is to provide a compact arrangement of cylinders and pumps whereby the same may be conveniently assembled about a common shaft.

Still another object of the present invention is to provide an engine construction in which the ordinary cranks and connecting rods are entirely eliminated and the power transmitted through a series of cams, the number of which bears a particular relation to the number of cylinders employed.

The foregoing and other objects, together with their attendant advantages, will be apparent as the invention becomes better understood, by reference to the accompanying specification and drawings forming a part thereof, it being premised that changes may be made in the various details and the manner of operation within the scope of the appended claims without departing from the spirit of the invention.

In the accompanying drawings:—

Figure 6 shows in longitudinal section a modified construction of a 16 cylinder engine.

Figure 1:
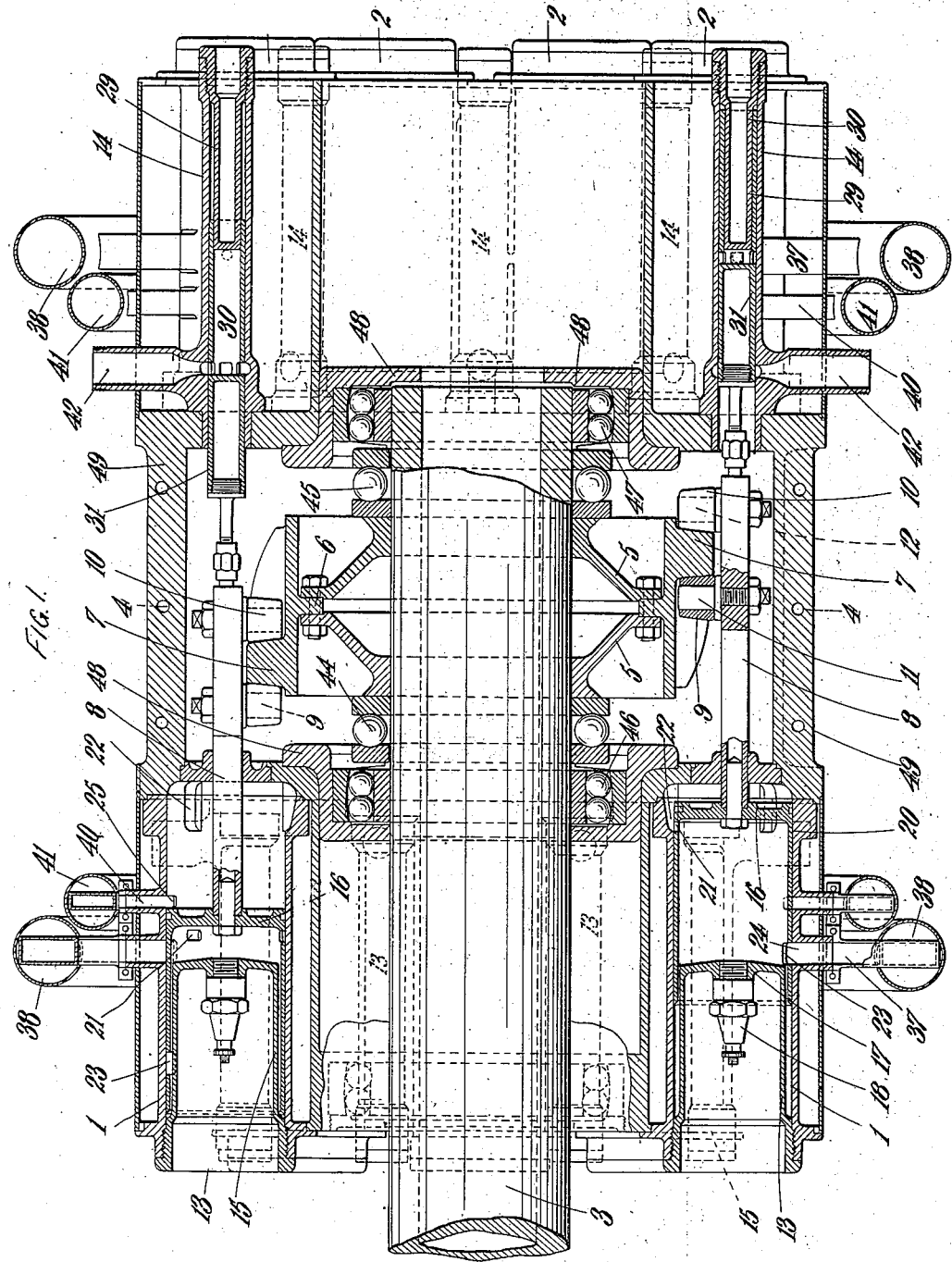
Figure 1 is a longitudinal section of a 16 cylinder engine embodying the features of the invention.
Figure 2:
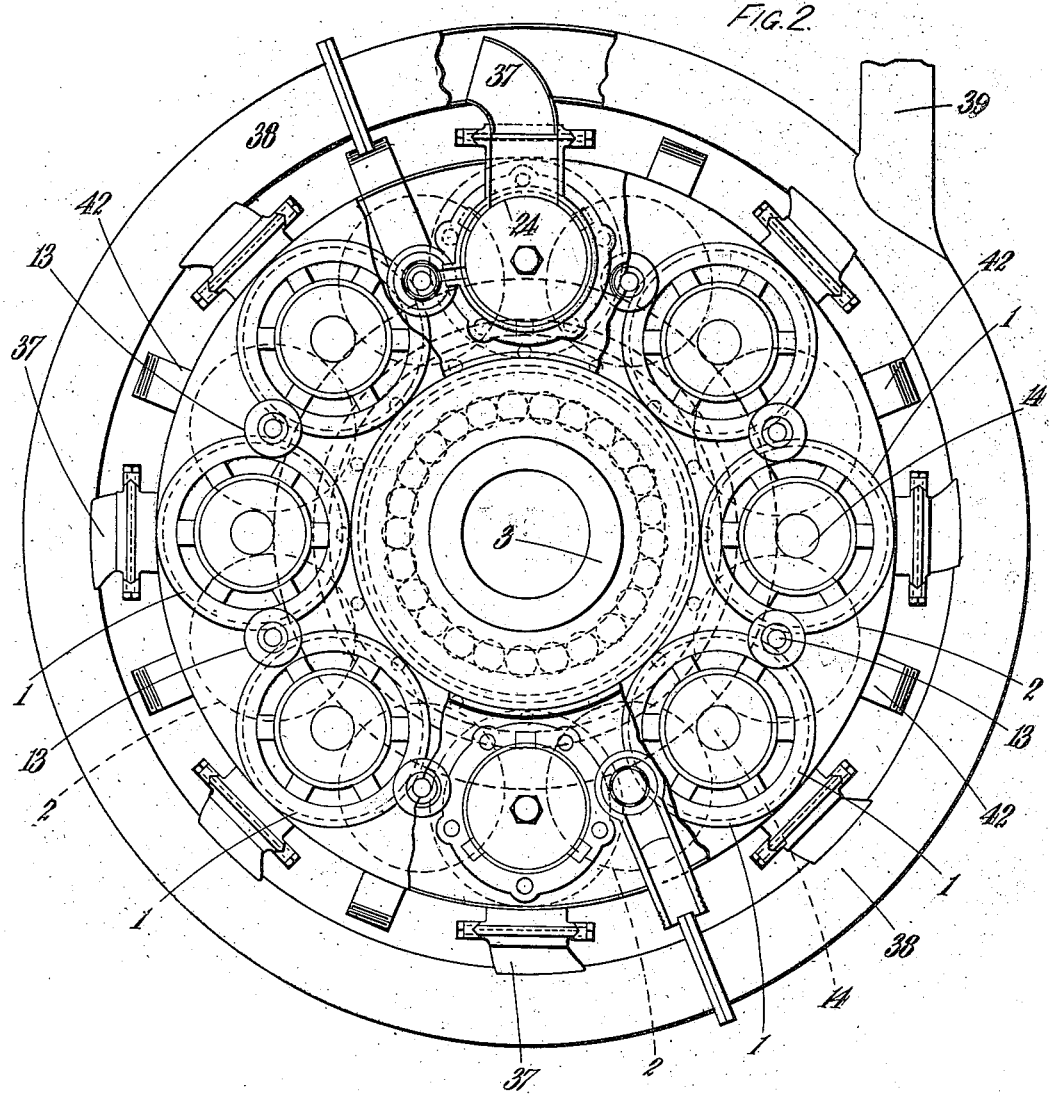
Figure 2 is an end view thereof partly in section.

As may be seen from Figures 1 and 2, tne sixteen cylinders 1, 2 are parallel with the common engine shaft 3 and are arranged in two sets on both sides of the middle plane 4—4 of the engine, each set consisting of the same number of cylinders, that is eight. The cylinders of each set are arranged in a circle round the common shaft 3 and the two sets are staggered so that the axes of the cylinders 1 of one set pass between the axes of the cylinders 2 of the second set. The two sets are opposed as regards the direction of the stroke and act upon a common rotor 5 arranged between the sets in the middle plane of the engine. The rotor is fixedly mounted on the shaft 3 and consists of a drum which is made of two halves connected by bolts 6. The rotor is provided with a wave shaped cam path or guide made in the form of a rib 7. The number of complete waves of the cam path is, according to the present invention, so chosen as to obtain the most uniform distribution of impulses per unit of time, thereby resulting in an even driving torque. To obtain this uniform distribution of impulses it is desirable that the number of complete waves, and the number of cylinders have no common factor greater than unity. Thus, if two sets of cylinders are employed, the total number of which is an even number, there should be provided an uneven number of waves. If, however, only one set of cylinders is used, the number of waves may be an even number provided the number of cylinders is uneven. All the piston rods 8 of both sets of cylinders engage with this cam path, each by means of two conical rollers 9 and 10 mounted on lateral projections 11 and 12 on the rods. The number of complete waves of the cam path (see Figure 3) is five. Between the cylinders are arranged the fuel pumps, those arranged between and supplying the cylinders 1 being designated by the reference numeral 13 and those of the other set of cylinders 2 being designated by the numeral 14. Each fuel pump is coaxial with a cylinder of the opposite set and coupled direct to its piston, as may be seen from Figure 1 which shows the direct coupling of pumps 14 with piston rods 8 of cylinders 1.

It will be seen from the foregoing that the engine consists of sixteen units, each of which consists of a working cylinder 1 (or 2) and a pump 13 (or 14) adjacent to it.

The preferred construction of the working cylinders and pumps and the preferred two-stroke cycle will now be described.

Figure 4:
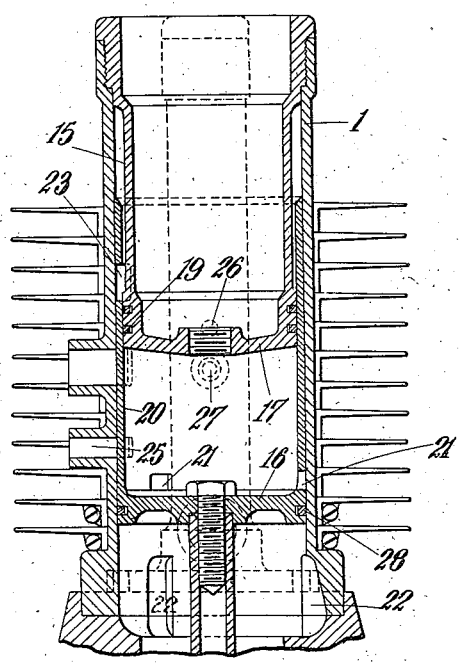
Figure 4 is a longitudinal section through one cylinder.

Referring to Figure 4, the working cylinder 1 is open at its outer end, provision being made at this end for a detachable cylinder head 15 which extends into the cylinder a distance approximately equal to the length of stroke of the piston 16 and is provided at the inner end with a base 17 for a sparking plug 18 (Figure 1). The head 15 may be fitted with spring rings 19, 19 (Figure 4) working on the inner diameter of a tubular extension or skirt 20 of the piston 16, or may have considerable clearance as shown in Figure 1, the space between 15 and 20 forming in the latter case part of the compression space.

The piston 16 is, as above mentioned, provided with a tubular extension or skirt 20 which is so arranged that the combustion takes place inside the skirt and not directly inside the working surface of the cylinder. The skirt therefore protects the working surface from the hot gases. This skirt also acts as a reciprocating sleeve valve and controls the admission of air and fuel, the scavenging and exhaust. For this purpose the skirt is provided with ports 21 coacting with transfer ports 22 at the inner end of the cylinder, port 23 coacting with exhaust port 24, and port 26 coacting with fuel admission port 27 of the cylinder. The piston 16 is provided with spring rings 28 working on the inner surface of the cylinder.

This construction of the piston has the additional advantage that the crown of the piston may be very effectively cooled by cool air admitted to the rear (or underside) of the piston at the top of the compression stroke. The arrangement of the exhaust port or ports and the transfer ports 22 is such as to enable the scavenging and the exhaust gases to follow a natural course or line of flow.

The pump 13 (see Figure 5 and right hand side of Figure 1 showing identical pump 14) has a stationary and preferably adjustable piston 29 and a movable cylinder 30 which by means of an extension piece 31 is coupled directly to the piston rod 8 of the corresponding cylinder of the opposite set. The piston is provided with rings 32 of compressed fibre, particularly when working with petrol, and the fuel injected may in that case consist of approximately half petrol vapour and half air. The cylinder 30 is provided with ports 33 co-operating with fuel admission ports or an annular induction port 34 in the pump body. One of these ports 33 also coacts with fuel injection port 35 in the pump body which, through passage 36, communicates with port 27 of the working cylinder.

The cycle of operations is as follows:—

Assuming that the combustion of gas behind the piston 16 has driven it to the inner dead centre (in Figure 4 this is the bottom dead centre), it will be found that the ports 21 in the piston 16 have come in alignment with the outer end of the transfer passages 22 at the inner end of the cylinder wall permitting of air compressed in front of the piston (see bottom of left hand side of Figure 1) to be admitted through 22, 21 to the space surrounded by the skirt 20, driving out the remaining burnt gases through 23 and 24 which are in full open position.

During the upstroke (Figure 4) or out-stroke (Figure 1) the exhaust port 24 is closed and it will be found on reference to the cam path diagram (Figure 3) that the piston of the fuel pump connected to the cylinder in question, is at, or near, the top of the compression stroke and that the ports 33 in the moving pump cylinder 30 are coming in alignment with the port or ports 35 in the pump body. Fuel and air mixture are injected through 35, 36, 27, 26, which together with air already in the cylinder will make up the firing charge.

At the (outer or) top dead centre the port 25 admits air to the (inner or) underside of the piston 16 where it is compressed during the firing stroke. The inrush of this cold air cools the piston crown. This position is shown at the top of the left hand side of Figure 1. During this stroke the fuel pump cylinder 30 reaches the (inner or) bottom dead centre (see Figure 5) when the ports 33 register with the port or annular passage 34 admitting a fresh charge of fuel and air mixture to the pump which is thereafter transferred to the working cylinder thus completing the cycle.

Since there are five waves in the circumference of the rotor, this cycle is repeated five times per unit per revolution and there will therefore be 80 impulses per revolution.

Figure 3:
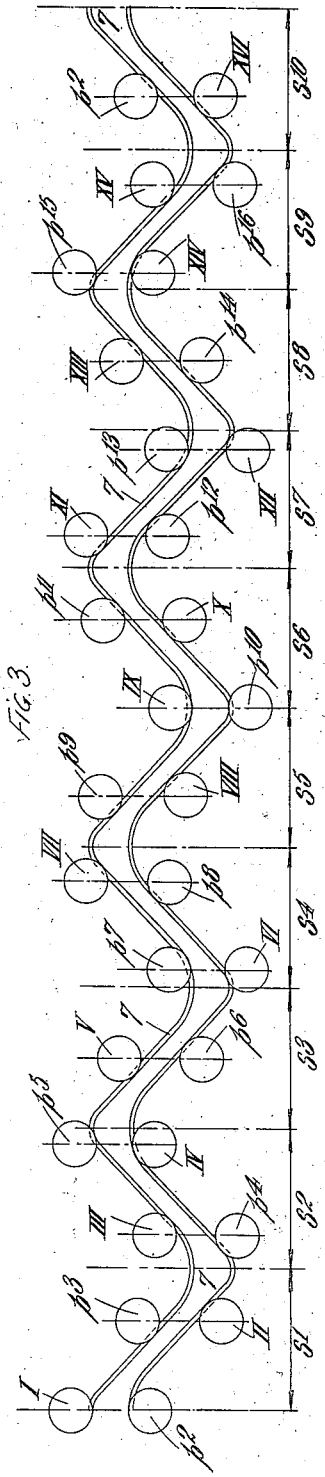
Figure 3 shows a development of the cam.

By examining the diagram shown in Figure 3, it will be found that the sixteen impulses taking place in the sixteen cylinders when the rotor moves through an angle corresponding to one wave, are all of different phases that is the impulses overlap but there are no cylinders working in unison. Owing to this uniform distribution of impulses and the very large number of impulses per revolution a very high evenness of torque may be obtained somewhat similar to that of a turbine or electric motor.

In Figure 3, the positions of the cylinders and the pumps are indicated by circles which may be taken to represent the roller 9 and 10 engaging with the cam rib 7. The cylinders are numbered consecutively I to XVI and the corresponding pumps supplying these cylinders $p^1$ to $p^{16}$. The strokes are marked $s^1$ to $s^{10}$.

The exhaust ports 24 of each set of cylinders are connected by passages 37 to a circular duct 38 common to all cylinders of the set. These passages are arranged as may be seen from Figure 2, in such a manner that the direction of flow into the duct 38 is tangential to the duct so that the movement in the duct is a continuous flow in one direction. The duct 38 has an exit pipe 39 which may lead to the atmosphere or a silencer.

The air inlets 40 leading to ports 25 are in the same manner connected to a common annular duct 41 communicating with the atmosphere, and the fuel inlets 42 may in a similar manner be connected to a common fuel supply (not shown). An automatic valve may be provided to control the admission of air through duct 41.

Figure 5:
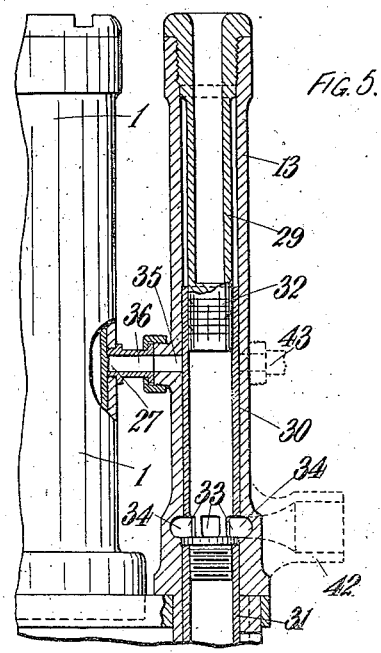
Figure 5 is a longitudinal section through a fuel pump and part of the adjacent engine cylinder.

Each pump may, as indicated by dotted lines in Figure 5, be connected to the other adjacent cylinder by a passage 43 in case it should be desired to change the direction of injection for the purpose of reversing the engine. Any means for changing the direction of injection may be used, for instance the cylinders 30 of the pumps may be adapted to be turned and the ports in the cylinders may be adapted to coact either with passage 36 or 43.

The shaft 3 may be mounted on two thrust ball bearings 44, 45, and two running ball bearings 46, 47, carried by annular frame members 48. The cylinders 1 and 2 are connected by longitudinal frame members 49.

The construction shown in Figure 6 differs from the one previously described chiefly in the construction of the working cylinders 50 and pistons 51. The air for scavenging and combustion is admitted to the rear or underside of the piston 51 by a port which is uncovered by the tubular extension or sleeve 53 of the piston at the end of the compression stroke, and is then compressed during the firing stroke. At the end of the firing stroke the compressed air passes through port 58 in the sleeve and transfer ports 54 to the rear of the piston and drives out the combustion products through port 55, passage 56 into the common annular exhaust duct 57. The exhaust port 55 is then closed by the sleeve 53 and shortly afterwards fuel is injected by the pump in the manner previously described through port 59.

From the foregoing it will be apparent that the shape of the cam path determines the length of stroke by the working pistons, this stroke being equal to the distance in the direction of the axis between the trough and the peak of each of the cam waves. The troughs of the waves may have a radius of curvature large enough to retard or slow down the movement of the piston at the end of the working stroke and the beginning of the return stroke, to such an extent that the complete scavenging and transfer of gases is insured. On the other hand, the peaks may have a small radius of curvature, this radius being substantially equal to the radius of the roller through which the piston thrust is communicated to the rotor.

It will be understood that according to the construction described, an engine having sixteen cylinders, eight on each side, and having a rotor with five complete waves, will produce a shaft speed of two hundred revolutions per minute, assuming the number of explosions per cylinder per minute to be one thousand. During each revolution there will be 16x5=80 impulses.

We claim:

1. An internal combustion engine, comprising a shaft and a plurality of sets of cylinders surrounding said shaft, each of said cylinders having its longitudinal axis extending substantially parallel to said shaft, the cylinders of one set being staggered with respect to the cylinders of the other set, substantially as described.

2. An internal combustion engine, comprising a shaft, a plurality of sets of cylinders surrounding said shaft, the longitudinal axis of each of said cylinders being substantially parallel to said shaft, the cylinders of one set being staggered with respect to the cylinders of the other set, and fuel pumps alternating with the cylinders of each set, substantially as described.

3. An internal combustion engine, comprising a shaft, a plurality of sets of cylinders surrounding said shaft and having their longitudinal axes extending parallel thereto, each of said sets comprising alternating explosion cylinders and pump cylinders, and means for transmitting power from said power cylinders to said shaft for rotating the same, said means comprising a cam having a plurality of waves cooperating with said pistons, substantially as described.

4. An internal combustion engine, comprising a shaft, a plurality of cylinders surrounding said shaft, a piston in each of said cylinders, a cam having a plurality of waves cooperating with said pistons, the total number of waves having no common factor greater than unity with the total number of cylinders, said cylinders being arranged in sets one on each side of said cam with the cylinders of one set staggered with regard to the cylinders of the other set, and fuel pumps alternating with said cylinders, substantially as described.

5. An internal combustion engine, comprising a shaft, a plurality of cylinders surrounding said shaft, a piston in each of said cylinders, a cam having a plurality of waves cooperating with said pistons, the total number of waves having no common factor greater than unity with the total number of cylinders, said cylinders being arranged in sets one on each side of said cam with the cylinders of one set staggered with regard to the cylinders of the other set, and fuel pumps alternating with said cylinders and directly coupled to said pistons, substantially as described.

6. An internal combustion engine, comprising a shaft, a cam, sixteen cylinders arranged in two sets of eight cylinders each, with one set of cylinders on each side of the cam, said cylinders having their longitudinal axes extending substantially parallel to the shaft and at substantially right angles to the cam with the cylinders of one set staggered with relation to the cylinders of the other set, a piston in each of said cylinders, and means connecting each of said pistons to said cam, substantially as described.

7. An internal combustion engine, comprising a shaft, a plurality of sets of cylinders surrounding said shaft, the longitudinal axis of each of said cylinders being substantially parallel to said shaft, the cylinders of one set being staggered with respect to the cylinders of the other set, and fuel pumps alternating with the cylinders of each set, said cylinders and said fuel pumps being arranged in pairs and extending in substantially axial alignment, substantially as described.

The testimony whereof they have hereunto set their hands in the presence of two witnesses.

HAROLD SMITH.
MARSHALL HARCOURT PAINE.

Witnesses:
FRANK H. M. MACINTYRE,
YVONNE SOKAL.